(12) United States Patent
Corzo

(10) Patent No.: US 10,774,967 B1
(45) Date of Patent: Sep. 15, 2020

(54) CAM LEVER FLANGE CONNECTIONS

(71) Applicant: Mario Manufacturing, Inc., Houma, LA (US)

(72) Inventor: Mario Corzo, Opelousas, LA (US)

(73) Assignee: Mario Manufacturing, Inc., Houma, LA (US)

( * ) Notice: Subject to any disclaimer, the term of this patent is extended or adjusted under 35 U.S.C. 154(b) by 336 days.

(21) Appl. No.: 15/949,300

(22) Filed: Apr. 10, 2018

Related U.S. Application Data

(60) Provisional application No. 62/483,626, filed on Apr. 10, 2017.

(51) Int. Cl.
*F16L 37/18* (2006.01)

(52) U.S. Cl.
CPC .................................. *F16L 37/18* (2013.01)

(58) Field of Classification Search
CPC ............ F16L 37/18; F16L 37/12; F16L 37/16
USPC .................................... 285/87, 88, 312, 394
See application file for complete search history.

(56) References Cited

U.S. PATENT DOCUMENTS

| | | | | |
|---|---|---|---|---|
| 48,674 A | * | 7/1865 | George | F16L 23/14 |
| | | | | 285/405 |
| 80,407 A | * | 7/1868 | Bush | F16L 27/0849 |
| | | | | 285/283 |
| 408,434 A | * | 8/1889 | Pringle | F16L 19/06 |
| | | | | 285/310 |
| 894,300 A | * | 7/1908 | Welles | E05B 65/006 |
| | | | | 292/257 |
| 1,047,063 A | * | 12/1912 | Irving | F16L 37/18 |
| | | | | 285/312 |
| 1,483,454 A | * | 2/1924 | Kraft | F16L 37/18 |
| | | | | 285/332 |
| 5,518,278 A | * | 5/1996 | Sampson | F16L 37/18 |
| | | | | 285/312 |
| 5,988,697 A | * | 11/1999 | Arosio | F16L 37/23 |
| | | | | 285/124.1 |
| 8,083,265 B1 | * | 12/2011 | Chen | F16L 37/18 |
| | | | | 285/312 |
| 2019/0316716 A1 | * | 10/2019 | Zimmerman | A01G 25/00 |

* cited by examiner

*Primary Examiner* — Aaron M Dunwoody
(74) *Attorney, Agent, or Firm* — James Creighton Wray

(57) ABSTRACT

Flanges on high pressure hoses and on fixtures such as pumps and receivers are configured for rapid connection to other flanges. Connecting pins have first ends fixed to first flanges and have second ends with flattened sides with transverse smaller pins that extend out of holes in second joined flanges. Levers have pair clevises at first ends. The pair clevises have cams with thicknesses increasing from openings that fit over projecting ends of the smaller pins. As the levers are pressed toward the outer surfaces of the joined flanges, they increasingly move the flanges into tight contact with each other.

10 Claims, 6 Drawing Sheets

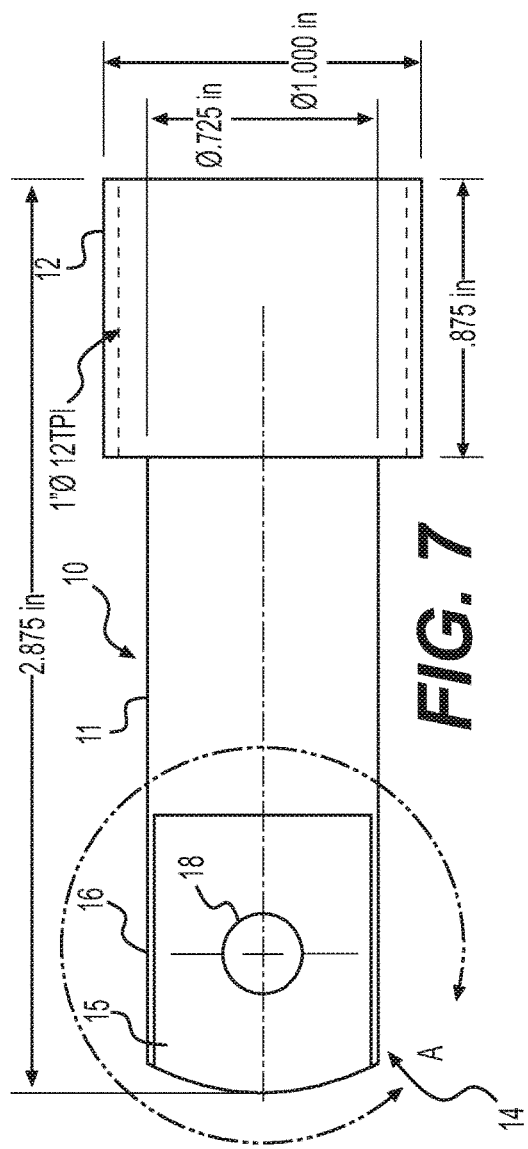
FIG. 7
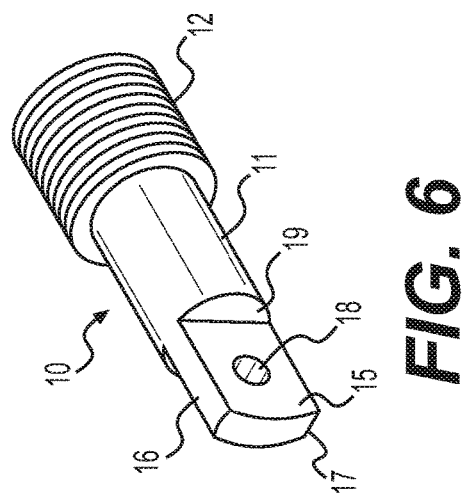
FIG. 6
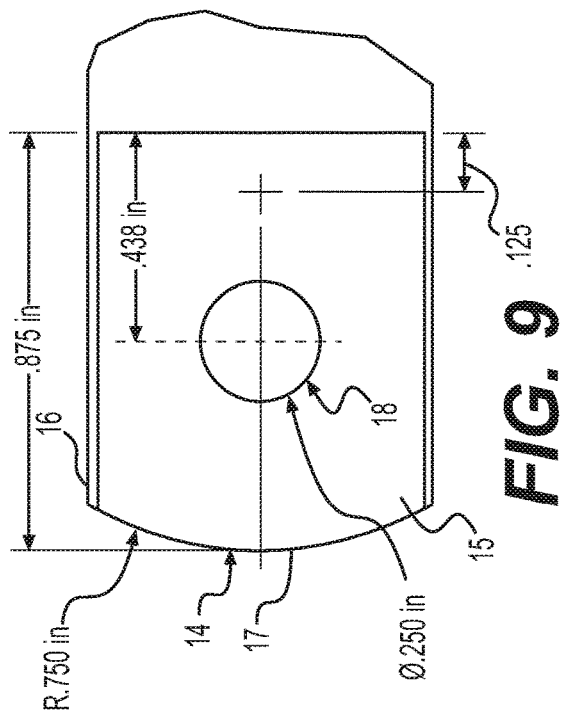
FIG. 9
FIG. 8

CAM LEVER FLANGE CONNECTIONS

This application claims the benefit of U.S. Provisional Application No. 62/483,626 filed Apr. 10, 2017, which is hereby incorporated by reference in its entirety as if fully set forth herein.

BACKGROUND OF THE INVENTION

Flanges connecting high pressure hoses together or to fixtures require bolting. Eight or more bolts are usually employed. Each bolt is inserted. A nut is finger threaded on an opposite end. A second bolt across from the first bolt is inserted, and a second nut is secured on the second bolt. A third bolt is inserted halfway around between the first and second bolts, and a third nut is threaded by hand on the third bolt. Then a fourth bolt is inserted in the flange opposite the third bolt, and a fourth nut is started on the fourth bolt. The process is repeated until all remaining bolts are inserted and all nuts are threaded on the bolts. A wrench is used to hold a bolt head on one flange, while a power wrench lightens the nut on the other end of the bolt. Those steps are repeated eight times in steps across the flange.

Needless to say, a great amount of time is necessary to secure flanges to each other. Needs exist for faster fastenings of flanges.

SUMMARY OF THE INVENTION

The present invention solves the problems of the prior art by providing Cam Lever Flanging (CLF). The flanges that are joined are the same. The connectors and connecting steps widely differ from the past ones.

Large connecting pins have enlarged heads and shafts that fit through the aligned fastener holes in the flanges.

The large pins have cylindrical shafts and generally rectangular portions with flattened parallel sides and rounded ends and edges. The generally rectangular portions extend out of one of the joined flanges. Small pins have rounded ends and lengths slightly less than diameters of the shafts of the large pins. The small pins are press fit, spin welded, fused or otherwise secured in perpendicular holes located a precise distance from the shoulders defining ends of the flattened parallel sides of the large connecting pins.

When the large pins are fully inserted through the bolt holes in the flanges, the flattened sides extend from the bolt holes, and the small pins are spaced precisely from the flanges.

Small levers are provided with handles and spaced "C"-shaped cammed clevises at ends of the handles. The two clevises on each handle are separated by a distance slightly greater than a distance between the two parallel flattened parts of the large pins. The thickness of each clevis increases as a cam from a thinner part near an opening of the "C"-shape to a thicker part 90° (one quarter turn) from the opening of the clevis.

To secure the joining of the flanges, the small levers are held. The openings in the spaced clevises at the ends of the lever are aligned with the small pins, and the tips of the clevises are slid under the pins. The levers are rotated, bringing the thick part of the clevises between the small pins and the surfaces of the flanges and camming and locking the flanges together. The handles of the small levers are left lying on the flange surfaces.

It takes one person less than a minute to engage all of the pins, to rotate the levers and to secure the flanges.

In one embodiment, the enlarged heads of the pins are long and knurled and are driven into and permanently attached in the bolt holes of one of the flanges. Bolt holes in the flange to be joined are aligned with the large pin shafts, and the flanges are pressed together, taking a few seconds. Pressing the flanges together exposes the flattened sides of the shafts and the small pins. Quickly, paired devises on the end of one lever are engaged with one of the small pins, and the handle of the lever is turned and rested against the flange. That inserting and turning of levers is repeated in cross patterns until all the pins are locked, often in less than a minute.

In one embodiment, the handles of the levers are attached to the flange holding the fixed heads of large protruding pins. In one form of the attachments the flanges have flexible tethers with first ends of the tethers attached to the flanges and second ends of the tethers attached to the handles.

These and further and other objects and features of the invention are apparent in the disclosure, which includes the above and ongoing written specification, with the claims and the drawings.

BRIEF DESCRIPTION OF THE DRAWINGS

FIG. 6 is a perspective view of a new flange locking pin

FIG. 7 is an elevation of the large locking pin shown in FIG. 6.

FIG. 8 is an end view of the large locking pin shown in FIGS. 6 and 7.

FIG. 9 is an elevational detail of a flattened side of the large locking pin taken from A in FIG. 6.

DETAILED DESCRIPTION

Figure 1:
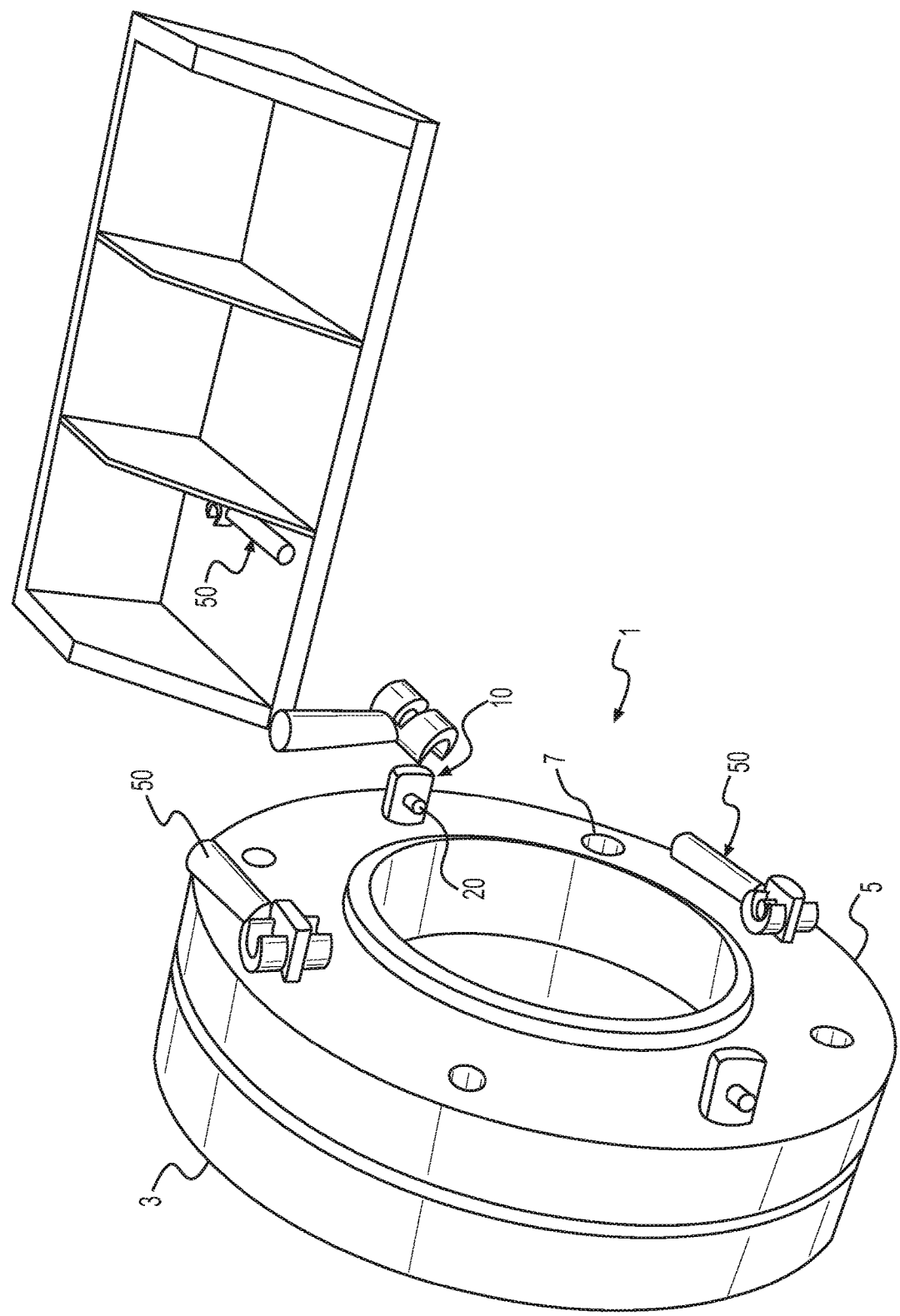
FIG. 1 is a perspective view of two flanges joined by the new pins and levers.

FIG. 1 is a perspective view of two flanges 3, 5 joined by the new pins 10 and locking levers 50.

Figure 2:
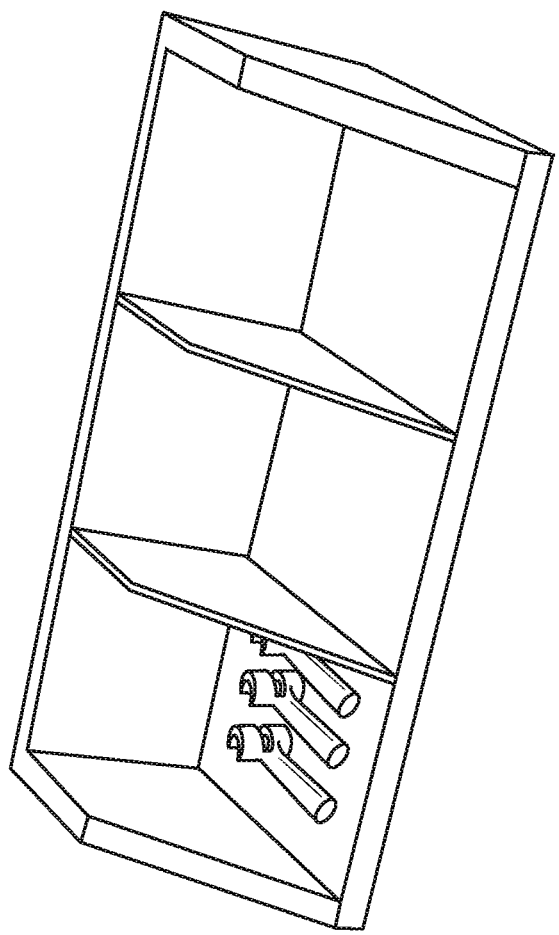
FIGS. 2-4 show progress in locking of the levers.
Figure 2:
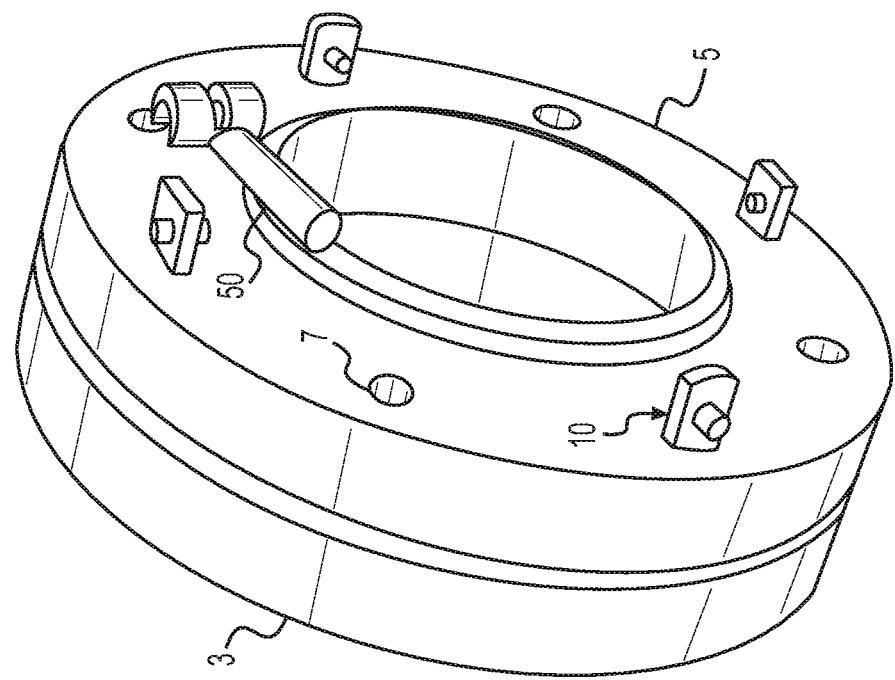
Figure 3:
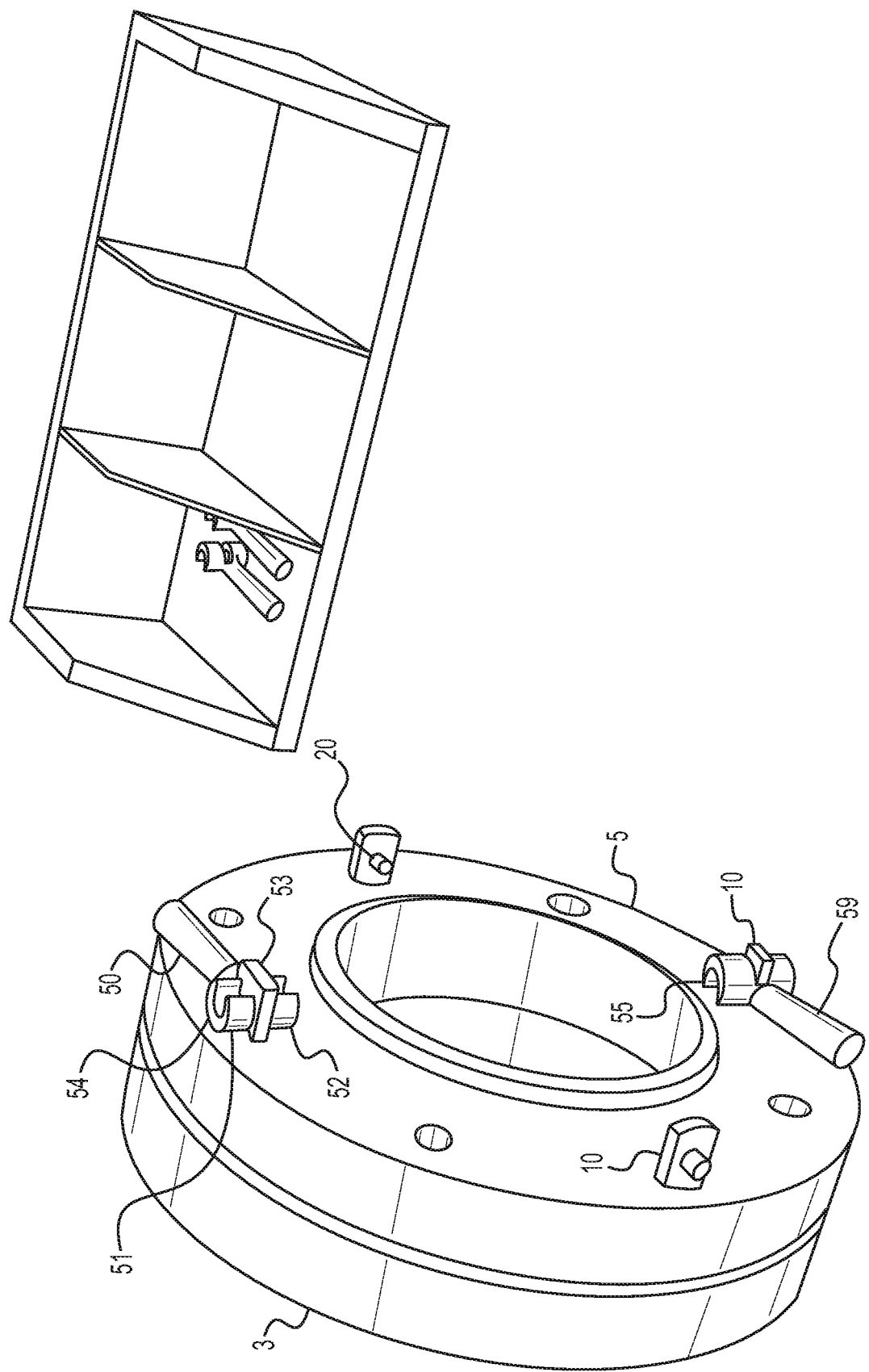
Figure 4:
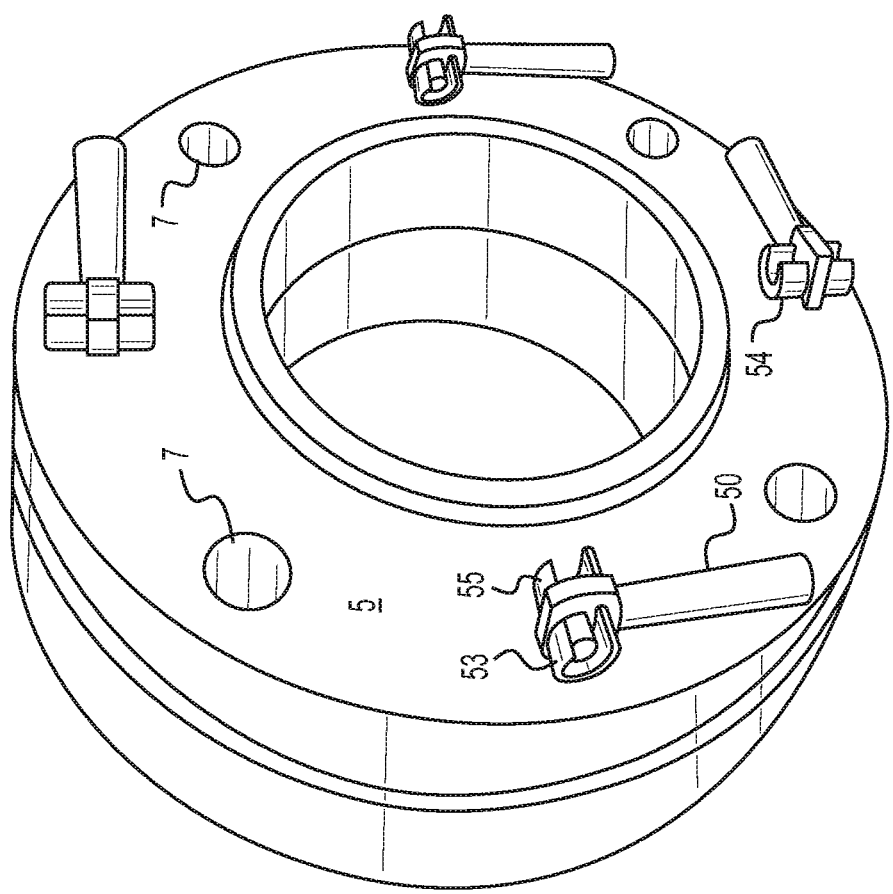

FIGS. 2-4 show progress in locking of the levers 50.

Referring to FIGS. 1-4, the new flange locking system 1 locks flanges 3 and 5 together. Large pins 10 extend through bolt holes 7 in the two flanges. Small perpendicular pins 20 are fixed in flattened protruding parts of large pins 10. Cammed levers 50 are then connected to the small pins 20.

Levers 50 have pairs of "C"-shaped cammed clevises 51, 52 seen in FIG. 3. Thicknesses of the clevises increase from tips 53 to bases 54. In one form openings 55 of the clevises are positioned over the small pins 20, and the handles 59 are lifted and rotated 180° until the handles 59 lie flat against flange 5. In that form the thickness of the cams begins increases as the handles are raised and turned. The large pins 10 are tightened and locked by camming the small pins 20 away from the flange 5. The engaging, rotating, camming and locking continue until all pins 10 are locked and the flanges 3 and 5 are securely joined together.

Figure 5:
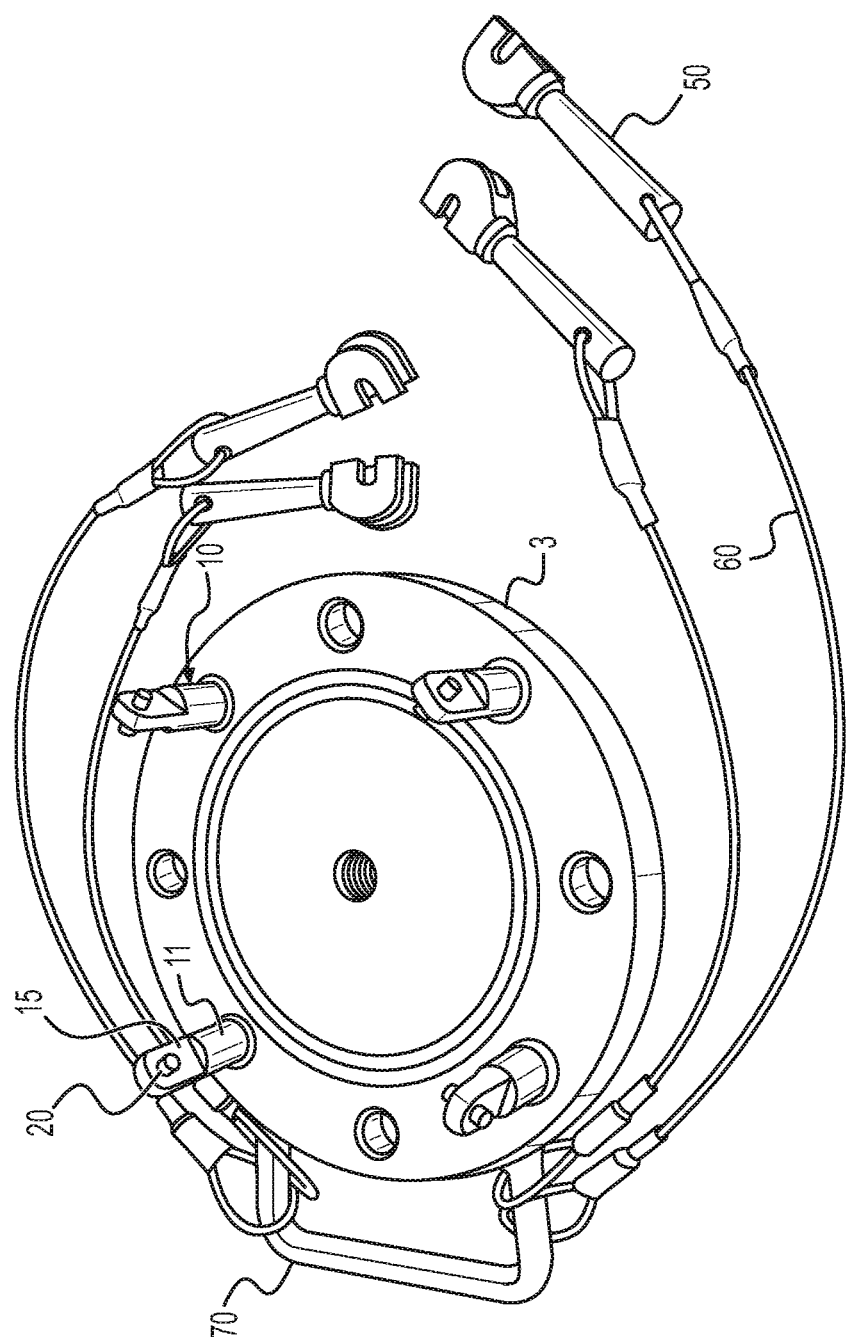
FIG. 5 shows an embodiment with flexible tethers securing the cammed locking levers to a flange permanently holding heads of large locking pins. The shafts and flattened sides of the large pins extend from the flange. The fixed small pins extend from the flattened sides of the large pins.

FIG. 5 shows an embodiment with flexible tethers 60 securing locking levers to a flange 3. Also shown in FIG. 5 is the flange 3 permanently holding heads of large locking pins 10. The shafts 11 and flattened sides 15 of the large pins extend from the flange 3. The fixed small pins 20 extend from the flattened sides. FIG. 5 shows tethers 60 attaching each handle 70 to flange 3. The tethers hold the levers by the flange so that the cam levers are available quickly when the flanges are being joined. The large pins 10 are shown mounted and fixed in the flange 3.

In one form the pins 10 may extend through flange 3 and may be flattened at opposite ends which hold the small pins 20, so that flange 3 may be inserted between two flanges 5 and join and lock the two flanges to an intermediate flange 3. In that case two times as many levers may be tethered to the flange 3.

FIG. 6 is a perspective view of an example of a new flange locking pin 10. FIG. 7 is an enlarged side elevation of the large locking pin 10 shown in FIG. 6. FIG. 8 is an end view of the large locking pin 10 shown in FIGS. 6 and 7. FIG. 9 is an enlarged elevational detail of a flattened side 15 of the large locking pin 10 taken from A in FIG. 6.

As shown in FIGS. 6-9, each large pin 10 has a cylindrical head 12, a cylindrical central shaft portion 11 and a generally rectangular end portion 14 with flat parallel sides 15, rounded edges 16 and rounded end 17. A hole 18 is formed at a precise position through the sides 15. Shoulders 19 separate the shaft 11 and sides 15. The shoulders are positioned so that they are slightly within the bolt holes 7 of a second flange when the first and second flanges are joined. In one embodiment, the bolt holes in flange 3 are enlarged to receive and anchor heads 12 of pins 10. Heads 12 may have the same diameter or a slightly larger diameter compared to shaft 11 so that the heads may be press fit joined or welded in bolt holes in one flange. The heads may be replaced or augmented by enlarged heads that abut the opposite side of flange 3 shown in FIGS. 1-5.

Two similar flanges 3 with heads 12 fixed in each flange may be joined by extending pins 10 with sides 15 through bolt holes in the opposed flanges and tightening cam lever handles and devises on the opposite outer sides of the flanges.

While the invention has been described with reference to specific embodiments, modifications and variations of the invention may be constructed without departing from the scope of the invention, which is defined in the following claims.

I claim:

1. Apparatus comprising:
flange connectors configured for fitting into holes in flanges on high pressure hoses and on fixtures and for connecting flanges of high pressure hoses to each other or to fixtures, further comprising:
pins adapted to fit into and through holes in flanges, the pins having
heads created for preventing movement of the pins through holes of first flanges,
shafts extending from the heads adapted for fitting through holes in flanges,
rectangular portions of the shafts with
flattened sides adapted for projecting from the holes in second flanges, and
small pins fixed in the rectangular portions and extending from the flattened sides.

2. The apparatus of claim 1, further comprising:
cam levers adapted for connecting to the small pins extending from the flattened sides,
handles on the cam levers,
paired clevices connected to the handles, the clevices having:
openings adapted for placing the paired clevises on the small pins,
cams on the paired clevises, wherein the cams have increasing thicknesses from the openings to positions in line with the handles,
wherein the cams are configured for wedging between the small pins and a surface of a flange for tightly holding a first flange against a joined flange when the handles are moved toward an outer surface of a flange.

3. Apparatus comprising:
a first flange adapted for connection to a second flange on a high pressure hose or a fixture, the first flange having:
pins adapted for extending from the first flange and fitting through holes in the second flange, the pins having:
heads fixed by the first flange,
shafts extending from the heads and adapted for fitting through holes in the second flange, the shafts having:
flattened sides adapted for projecting from the holes in second flanges and extending beyond the holes in the second flanges, and
small pins fixed in the rectangular portions and extending from the flattened sides.

4. The apparatus of claim 3, further comprising:
cam levers adapted for connecting to the small pins extending from the flattened sides,
handles on the levers,
paired clevices connected to the handles, the clevices having:
openings adapted for placing the devises on the small pins, and
cams increasing in thicknesses from the openings,
wherein the cams are configured for wedging between the small pins and a surface of a flange for tightly holding a flange against a joined flange when the handles are moved toward an outer surface of a flange.

5. The apparatus of claim 4, further comprising flexible tethers having first ends connected to a flange and having second ends connected to the handles.

6. The apparatus of claim 5, wherein the first ends of the flexible tethers are connected to the first flange.

7. The apparatus of claim 5, wherein the second ends of the flexible tethers are connected to ends of the handles opposite the paired devises.

8. A method comprising:
providing flange interconnectors configured for fitting into holes in flanges on high pressure hoses and on fixtures and adapted for connecting flanges of high pressure hoses to each other or to fixtures, further comprising:
providing pins adapted to fit into and through holes in flanges, the pins having heads created for preventing movement of the pins out of holes of a first flange,
providing shafts extending from the heads adapted for fitting through holes in flanges,
providing rectangular portions of the shafts,
providing flattened sides on the shafts adapted for projecting from the holes in second flanges, and
providing small pins fixed in the rectangular portions and extending from the flattened sides.

9. The method of claim 8, further comprising:
providing cam levers adapted for connecting to the small pins extending from the flattened sides,
providing paired devices connected to the levers,
providing openings on the paired devices adapted for placing the paired devises on the small pins, and
providing cams on the paired devises, wherein the cams have increasing thicknesses from positions near the openings to positions remote from the openings.

10. The method of claim 9, further comprising:
providing handles on the cam levers, and
moving the handles and wedging the cams between the small pins and a surface of a flange for tightly holding a first flange against a joined flange when the handles are moved toward an outer surface of a flange.

\* \* \* \* \*